(No Model.) 2 Sheets—Sheet 1.

J. S. STONE.
ELECTRIC CIRCUIT.

No. 578,275. Patented Mar. 2, 1897.

Attest.
Srorilli Pierce
W. W. Swan

Inventor,
John S. Stone (No Model.) 2 Sheets—Sheet 2.
J. S. STONE.
ELECTRIC CIRCUIT.

No. 578,275. Patented Mar. 2, 1897.

UNITED STATES PATENT OFFICE.

JOHN S. STONE, OF BOSTON, MASSACHUSETTS, ASSIGNOR TO THE AMERICAN BELL TELEPHONE COMPANY, OF SAME PLACE.

ELECTRIC CIRCUIT.

SPECIFICATION forming part of Letters Patent No. 578,275, dated March 2, 1897.

Application filed September 10, 1896. Serial No. 605,369. (No model.)

*To all whom it may concern:*

Be it known that I, JOHN STONE STONE, residing at Boston, in the county of Suffolk and State of Massachusetts, have invented a new and useful Improvement in Electric Circuits for the Transmission of Variable Currents, of which the following is a specification.

The invention relates more particularly to the diminution of the effects known as "attenuation," "distortion," and "reflection" which variable currents experience when transmitted along electrical conductors having relatively high electrostatic capacity and when transmitted in heterogeneous circuits.

By my invention the inductance of an electric conductor is increased to such an extent as to reduce the attenuation and distortion of variable currents traversing the conductor. By my invention also the inductance of any portion of a heterogeneous circuit may be so proportioned with respect to the other electromagnetic constants of that portion of the circuit that no reflection will take place at the junctions of that portion of the circuit with the remainder of the circuit when a variable current is caused to circulate in the heterogeneous circuit.

Figure 1:
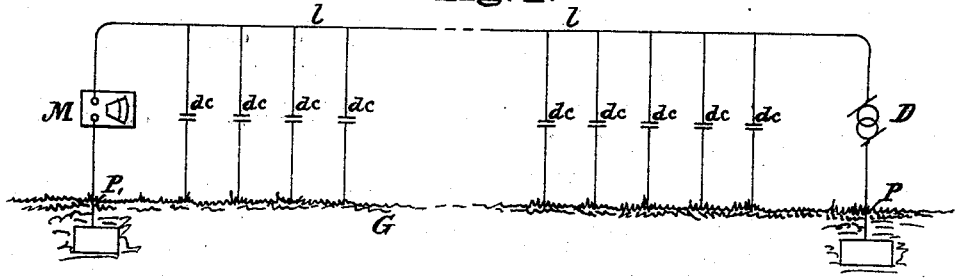
Figure 2:
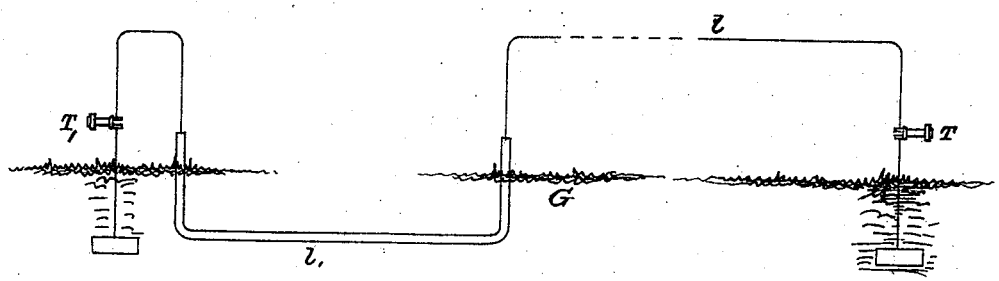
Figure 5:
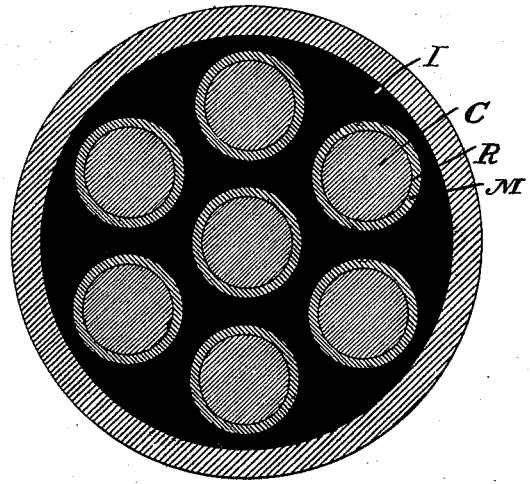
Figure 3:
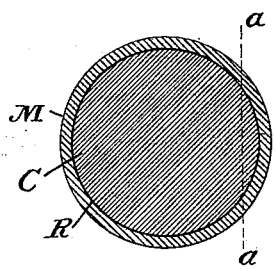
Figure 4:
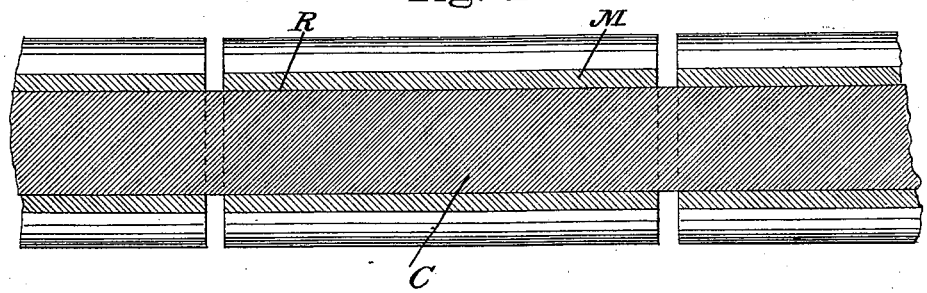

In the drawings, Figure 1 is a diagram illustrating the distributed capacity of an air-line electrical conductor grounded at one end through a generator of variable currents and grounded at the other end through a current-measuring device. Fig. 2 is a diagram illustrating a heterogeneous electrical circuit consisting in part of an air-line conductor and in part of an underground conductor. Fig. 3 is a cross-section of an electrical conductor constructed according to my invention. Fig. 4 is a longitudinal section on line $a\ a$ of Fig. 3. Fig. 5 is a cross-section of a cable made up of electrical conductors constructed according to my invention.

It has long been observed in telegraphy that in many instances, owing to the relatively great electrostatic capacity and resistance of the conductors along which the variable telegraphic currents are transmitted, but a small portion of the current developed at the sending end of the line proceeds all the way to the distant or receiving station, and that, moreover, in such cases the current-waves which do reach the distant station are not of the same form as that in which they were when they set out on their journey from the transmitting end of the line. The first of these effects is termed "attenuation" and the second is termed "distortion." Attenuation and distortion, as might be expected, were found to be more pronounced in the case of submarine cables, and especially in the case of Atlantic cables, on account of their great length and relatively great electrostatic capacity. At a later date, when it was attempted to transmit telephonic currents over circuits of relatively great electrostatic capacity and resistance, attenuation and distortion were again observed and were found to be even more pronounced in the case of the rapidly-varying telephonic currents than in the case of the more slowly variable telegraphic currents.

The explanation of the two phenomena—attenuation and distortion—is best given with the assistance of the diagram Fig. 1. In this diagram G is the ground, and a circuit is shown extending from the point P through a generator of alternating currents D, through a line-wire $l$, through a current-measuring device M, to the ground at the point P. The distributed capacity of the circuit is represented graphically in this diagram as consisting of a large number of small condensers $d$ C, bridged from the line conductor $l$ to earth. If these condensers be considered infinite in number and infinitesimal in capacity, then the diagram accurately represents a circuit possessing finite distributed capacity, and will therefore hereinafter be so considered. If now the generator D be caused to develop a rapidly-alternating current, the current so developed will pass along the line $l$, a portion of it being diverted at each branch circuit $d$ C, since, as is well known, condensers are not opaque to alternating currents, but offer an impedance to such currents, which impedance is inversely proportional to the capacity of the condenser and to the rate of alternation of the current. As a result of the innumerable small shunts therefore, a very considerable portion of the current developed by the generator D is diverted from the line-wire $l$ before reaching the current-measuring instrument M at the distant end of the circuit, and the current there recorded is therefore less than that which was developed in the generator D. This is the phenomenon called "attenuation."

If the alternating current developed by the generator D is not of the simple harmonic or sinusoidal character, but is of a complex periodic character, it consists of two or more simple harmonic components of different rates of alternation. Since the impedance of the condenser-shunts is less for the high rates of alternation than for the lower rates, a greater amount of the high frequency than of the low frequency components will be diverted through the condenser-shunts before the current reaches the distant end. In this way the current at the two ends will not only be of different strengths, but will also be different in wave form, since they will have different relative amounts of the different components. This phenomenon is called "distortion," and in this case at least we see that the distortion is produced by the unequal attenuation of the components of different frequency which compose the alternating current.

We may now pass to a consideration of the third phenomenon to which I have referred above, but which has not hereinbefore been specially described — namely, reflection. When light or any form of radiant energy passes from one medium into another in which the wave-speed is different, in general a reflection takes place at the surface of separation. In the same way when an electric wave or when a train of electric waves traveling along a heterogeneous circuit passes from one portion of the circuit to another a reflection of the waves takes place at the point of heterogeneity, and the reflected waves travel back whence they came, instead of proceeding to the farther end of the circuit.

It is easy to see that all three of the phenomena—attenuation, distortion, and reflection—are especially adverse to good telephony and telegraphy, whereas attenuation may be appreciably unfavorable even to the transmission of power to distances by means of alternating currents with the ordinary rates of alternation employed for that purpose.

It has been determined, mathematically, that the evil effects of excessive distributed electrostatic capacity along circuits can be greatly reduced by the addition to the circuit of suitable distributed inductance or self-induction, and for this purpose use has been made of, or it has been suggested that use be made of, various forms of compound wire in which a copper conductor is provided with an iron core or with an iron sheath, it being hoped thereby to increase the inductance of the circuit. Such compound wires have always failed to accomplish their intended purpose, for the reason of what is popularly termed the "skin effect." In other words, in the case of the copper conductor with the iron core an alternating current practically all flows in the copper and fails to penetrate the iron core to more than an infinitesimal amount. For this reason the compound wire as a whole acts as if it were a hollow copper cylinder and there is no appreciable increase in the inductance due to the core.

In the case where the iron forms a sheath about the copper the inductance is indeed increased; but in such cases, owing to the same tendency for the current to keep to the surface of the conductor, little current finds its way to the copper core, and the resistance of the compound wire is thereby so much increased as to more than offset the beneficial effects of the increase in inductance. For this reason such compound wires are likely to produce a still greater attenuation than if the iron were not there. It must be here understood that the attenuation is the combined result of the capacity and the resistance, neither being capable of producing it alone. Besides diminishing the attenuation, an increase in the distributed inductance may also be caused to prevent distortion; but in order to understand the effect of distributed inductance upon attenuation, distortion, and reflection it is necessary to consider the theory of these phenomena somewhat more definitely. This theory is best stated mathematically.

The factor which determines the attenuation of a train of simple harmonic waves of frequency $n = \dfrac{p}{2\pi}$ traveling along a conductor having resistance R, capacity C, and inductance L all per unit of length is $$x\, p \left[ \tfrac{1}{2}\, C\, L \left\{ \left( \dfrac{R^2}{L^2 p^2} + 1 \right)^{\!1/2} - 1 \right\} \right]^{1/2},$$

in which expression $x$ is the distance to which the train of waves have traveled. When the attenuation is excessive, it may be shown that this expression may be reduced by diminishing the ratio $\dfrac{R}{L\,p}$. In other words, for given frequency of current and capacity and resistance of circuit the attenuation may be reduced by increasing the inductance. In practice, however, it is by no means necessary or desirable to diminish the attenuation to zero; but in all telephone or telegraph circuits of any considerable length, and especially in cables, it is desirable to effect a diminution in the attenuation. For instance, I have found that a telephone-line having a resistance of two thousand six hundred and forty ohms and a distributed capacity of 4.11 microfarads is about two hundred per cent. more efficient with an inductance of 3.75 henrys than with an inductance of .915 henrys.

Passing now to a consideration of the theory of the effect of an increase of distributed inductance upon the distortion of the current-waves, it will be observed that when by a suitable increase of the factor L the fraction $\frac{R^2}{L^2 p^2}$ is made small compared to unity the expression for the attenuation reduces to $\frac{1}{2} R\, x \sqrt{\frac{C}{L}}$, which is independent of the frequency of the current. This means that if a sufficient distributed inductance be given a circuit the attenuation will be equal for all frequencies of current, and since the distortion in question is due to a difference of attenuation of current components of different frequencies it follows that if a sufficient distributed inductance is possessed by a circuit there can be no appreciable distortion.

The reflection of the current impulses which occur when waves pass from a portion of a circuit into another in which the electromagnetic constants differ is similar to that already mentioned, which takes place when the waves of light pass from one medium into another in which the index of refraction differs from that of the first medium. It follows from Maxwell's electromagnetic theory of light that light waves in passing from one transparent medium into another will always suffer some reflection at the interface of the media when the ratio $\frac{c}{u}$ of the specific inductive capacity to the permeability of the medium changes from one medium to the other.

It may be shown by a mathematical procedure similar to that which is employed in determining the conditions of reflection in the case of light that the conditions which must be fulfilled in order that there be reflection of a train of simple harmonic current-waves in passing from one portion of a circuit to another are that either the ratio $\frac{C\,p}{(R^2 + L^2 p^2)^{1/2}}$ or $\frac{R}{L\,p}$ change from the one portion of the circuit to the other. This follows directly from the fact that if the electromotive force at any given point in the circuit having distributed resistance, inductance, and capacity be E sin pt the current at that point, except as modified by reflections, will be, as I have found;

$$E \left\{ \frac{C^2 p^2}{R^2 + L^2 p^2} \right\}^{1/4} \sin \left[ pt + \tan^{-1} \left\{ \frac{\left(\frac{R^2}{L^2 p^2}+1\right)^{1/2}-1}{\left(\frac{R^2}{L^2 p^2}+1\right)^{1/2}+1} \right\}^{1/2} + \pi \right].$$

If, therefore, the ratio of $\frac{C\,p}{(R^2 + L^2 p^2)^{1/2}}$ change in passing from one portion of the circuit to the other, the relation of the amplitude of the current-wave to that of the electromotive-force wave will be disturbed at that point, whereas if the ratio $\frac{R}{L\,p}$ change in passing from one portion of the circuit to the other the phase relation of the current and electromotive-force waves will be disturbed at that point. This tendency to abruptly alter the amplitude and phase relation of the current and electromotive force at any heterogeneity in the circuit results in the development of a reflected train of waves at such heterogeneities, which prevent the discontinuities in the current and electromotive-force functions otherwise resulting there.

In the most important case in practice—i. e., when $\frac{R^2}{L^2 p^2}$ is negligible compared to unity—the ratio $\frac{C\,p}{(R^2 + L^2 p^2)^{1/2}}$ reduces to $\frac{C}{L}$ and the ratio $\frac{R}{L\,p}$ has ceased to influence, appreciably, the phase of the current. For this practical case, therefore, the conditions for reflection reduce to a change in the ratio $\frac{C}{L}$ in passing from one portion of the circuit to another. When $\frac{R^2}{L^2 p^2}$ is negligible compared to unity, this expression reduces to $\frac{C}{L}$. This expression is independent of the frequency and is the ratio of the constants of the circuit, which correspond to the specific inductive capacity and permeability of medium, as in the case of light-reflections just considered. The meaning of the last of the expressions given is that when the distributed inductance of the various sections of a heterogeneous circuit have been sufficiently increased the reflections of current-waves which take place at their junctions will be the same for waves of all frequencies, and therefore, even though reflections may take place at these junctions, no tendency to thereby distort the wave will occur, as all the components will be equally reflected. From these expressions it is also evident that by suitably proportioning the distributed inductance in each section of a heterogeneous circuit no reflection will take place at all. By this means a cable, whose capacity and resistance per mile is very much greater than that of an air-line to which it is connected, may have its inductance so proportioned as to avoid all reflections of current-waves at the terminal of the cable where it is connected to the line.

Fig. 2 represents diagrammatically a heterogeneous circuit extending from the ground at one end through a telephone T, through an overhead or air-line wire $l$, through an underground or cabled conductor $l'$, and back to ground through a second telephone T'. Let, for instance, the air-line portion of the circuit have a capacity of .008 microfarads per mile, a resistance of 10.56 ohms per mile, and an inductance of .00366 henrys per mile, which figures are common figures for the constants of lines of copper wire. Also let the cable conductor have a resistance of 42.24 ohms per mile, a capacity of .032 microfarads per mile, and let it be provided with a paramagnetic sheath sufficiently thick to insure an inductance of .01464 henrys per mile. Then no reflection of variable currents transmitted over the circuit will take place at the juncture of the cable and the air-line for the reasons hereinbefore given.

So far the effects to be avoided and the general manner proposed for suppressing them have been described. This manner of suppressing the evil effects of capacity involves giving the circuit suitable inductance, and the means of accomplishing this end may now be described.

For the purpose of increasing the inductance of a wire I surround the wire with a cylinder of paramagnetic material, such as iron, but in order to prevent the current from flowing along the surface of this iron cylinder, as in the case of the old forms of compound wire, in which a close-fitting iron cylinder is drawn immediately upon the copper core, I separate the iron cylinder from the copper core by an insulating or a relatively high resistance coating or film. The resistance of this coating or film, owing to the longitudinal discontinuities of the sheath, need not be great. In fact, if the longitudinal discontinuities be sufficiently frequent a mere coating of the oxids of the metals will suffice. Further, in order to prevent the iron sheath from unduly increasing the effective electrostatic capacity of the circuit and for other reasons which will be dwelt upon farther on, I make the iron cylinder discontinuous longitudinally.

The presence of one conductor in the neighborhood of another necessarily increases the electrostatic capacity of the latter, and to that extent the iron sheath surrounding the copper core increases the electrostatic capacity of the latter, but if the longitudinal sections be sufficiently small this increase in capacity will be the only resulting increase in capacity experienced. As far as this feature is concerned it is sufficient to make the longitudinal sections small compared to one-half of the wave-length of the electric current transmitted over the circuit. This latter condition is imposed by the fact that if the longitudinal sections of the sheath be as great or greater than one-half of the wave-length of the electric current to be transmitted over the core the individual sections of the sheath will have different portions simultaneously subjected to the extreme differences of potential of the positive and negative maxima of the waves, the effect of which on the current would be that of a spurious increase of electrostatic capacity.

The other conditions which demand the division of the sheath into relatively short longitudinal sections are relative to the prevention of the current from passing to the surface of the sheath, as already described, and these conditions are therefore closely allied with the insulation between the sheath and the core.

It is to be observed from what has been said above that both the insulation of the iron sheath from the core and its longitudinal discontinuity are made necessary by the fact that the sheath is conductive, for if the sheath were of an insulating material it would not permit currents to flow along its surface, as in the case of the old forms of compound wire with the consequent great loss of energy, and its presence would not necessarily produce a spurious increase in the electrostatic capacity, as in the case of a conductive sheath which is not longitudinally discontinuous. If, therefore, there were a medium which was highly paramagnetic, i. e., one that had a high premeability, such as iron, and was also a good insulator, it is evident from what I have said that I should prefer to employ such a medium in the place of the iron sheath, but since iron is conductive I am obliged to resort to the method of separating the sheath from the conducting-core by an insulator or by a high-resistance medium and making it longitudinally discontinuous in order to avoid the evil effects due to its conductivity. In order to prevent the current from passing to the sheath at one end of a section and returning to the core at the other end of the section, it is only necessary to make the impedance of the path via the sheath greater than that via the core. Of course this could be done with scarcely any film of high-resistance material between the core and the sheath if the sections were made sufficiently short, and it is advisable to make the longitudinal sections sufficiently short to materially assist in the operation of preventing the current from passing to the sheath.

In Figs. 3, 4, and 5, C represents the central conducting-core, M represents the paramagnetic sheath, while R represents the high-resistance separator.

In Fig. 5, I represents the insulation between the several conductors, each constructed in accordance with my invention.

Having fully described my invention, I claim—

1. The combination with an air-line electric conductor having definite capacity and self-induction, of a cable conductor consisting of an electrical conducting-core, provided with a longitudinally-discontinuous paramagnetic sheath of such dimensions as to so increase the self-induction of the conducting-core that the ratio of the capacity to the self-induction of the conducting-core shall be equal to the ratio of the capacity to the self-induction of the air-line conductor.

2. An electric conductor consisting of a conducting-core provided with a longitudinally-discontinuous paramagnetic sheath conductively separated from said conducting-core, substantially as described.

3. A heterogeneous electrical circuit, composed of sections the electromagnetic constants of each of which are so proportioned to each other and to the constants of the other sections that there can be no reflection at the junction of the sections when a variable current traverses the said circuit, substantially as described.

JOHN S. STONE.

Witnesses:
W. W. SWAN,
GEO. WILLIS PIERCE.